(No Model.) 2 Sheets—Sheet 1.
J. H. MITCHELL.
CAKE MACHINE.
No. 492,220. Patented Feb. 21, 1893.
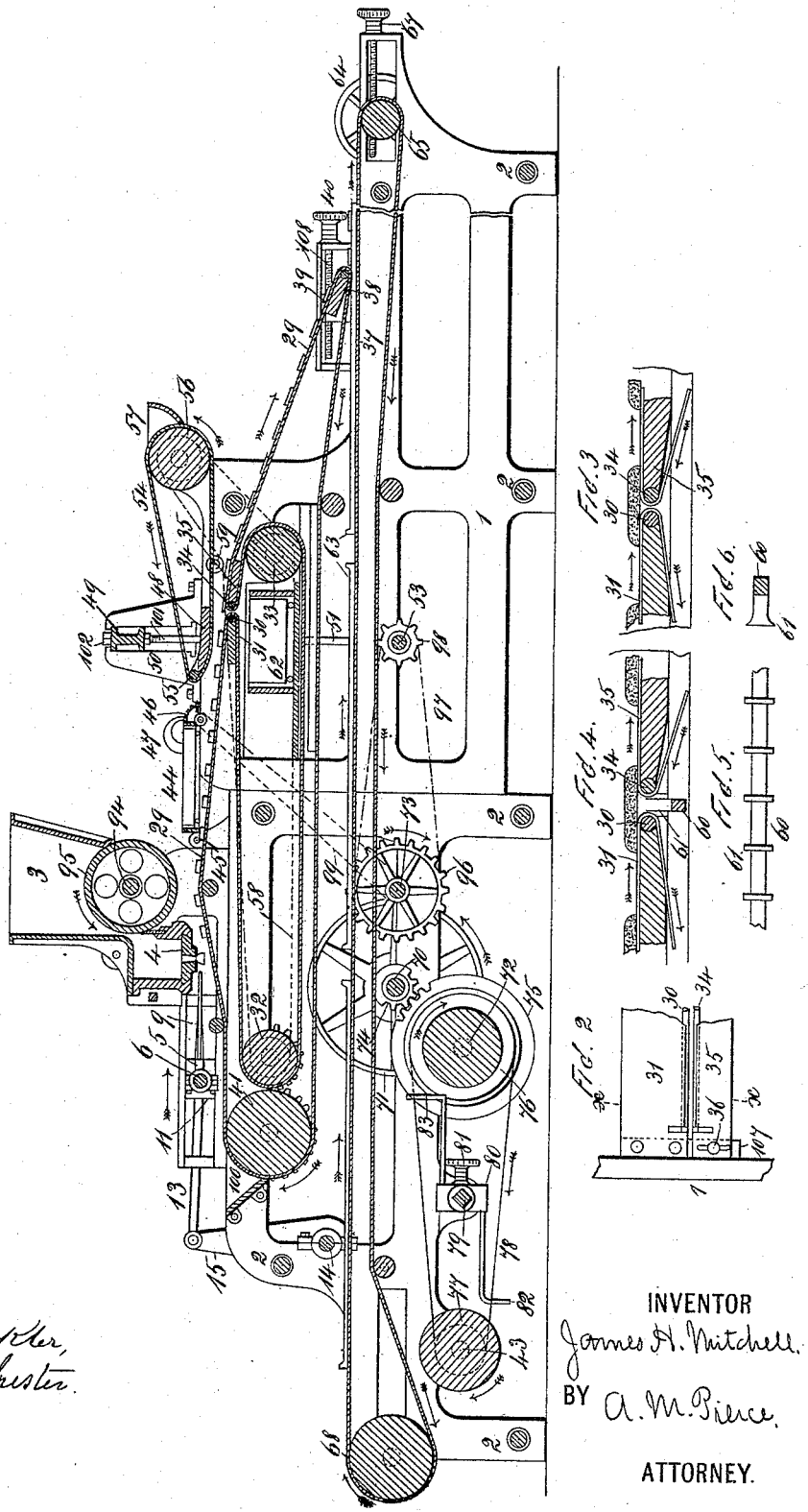
WITNESSES:
John Buckler,
Isabel Chester.
INVENTOR
James H. Mitchell.
BY A. M. Pierce.
ATTORNEY.

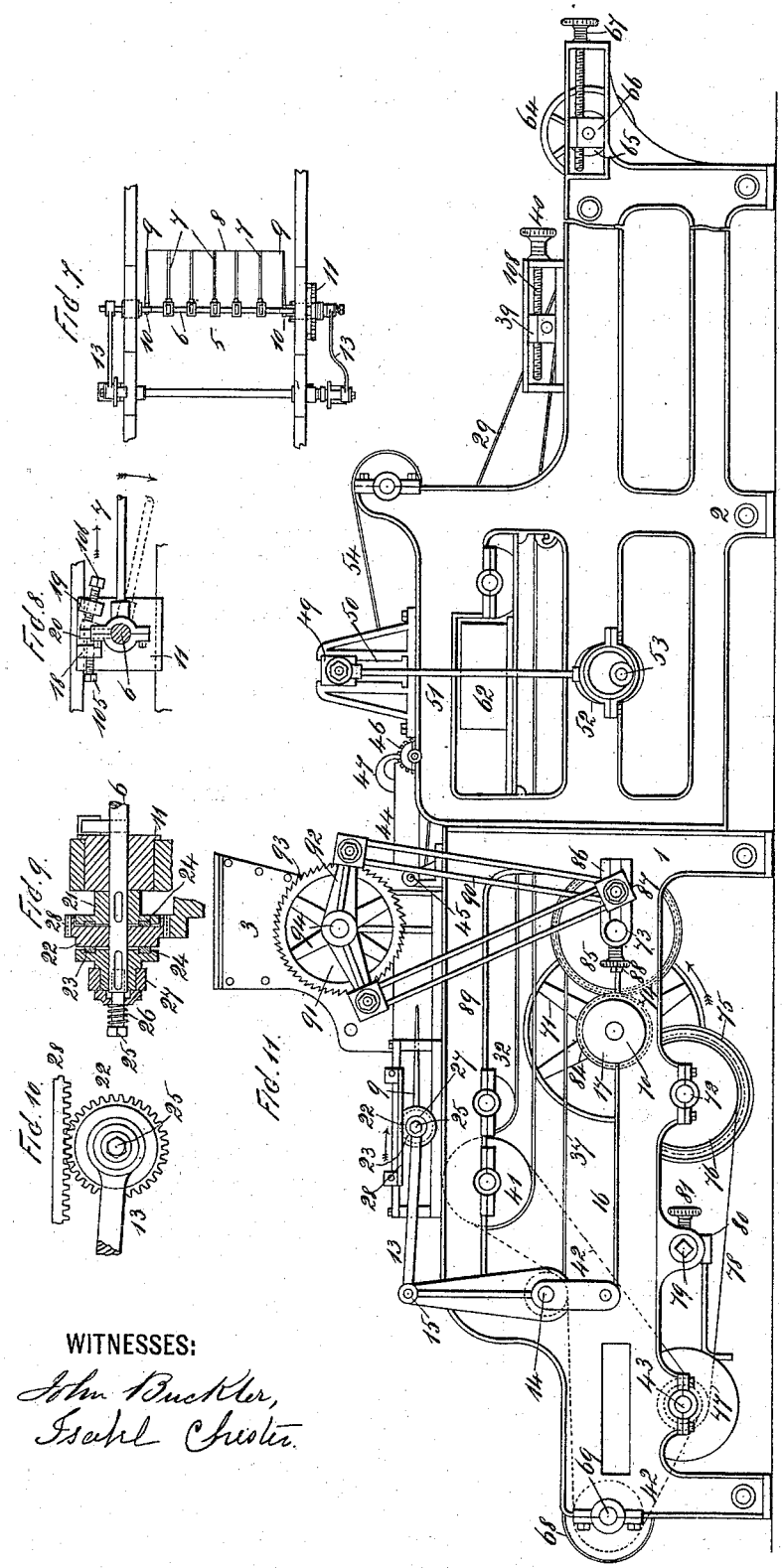

UNITED STATES PATENT OFFICE.

JAMES H. MITCHELL, OF PHILADELPHIA, PENNSYLVANIA.

CAKE-MACHINE.

SPECIFICATION forming part of Letters Patent No. 492,220, dated February 21, 1893.

Application filed July 19, 1892. Serial No. 440,545. (No model.)

*To all whom it may concern:*

Be it known that I, JAMES H. MITCHELL, a citizen of the United States, residing at Philadelphia, in the county of Philadelphia and State of Pennsylvania, have invented a new and useful Improvement in Cake-Machines, of which the following is a specification.

My invention relates especially to that class of soft dough cake machines in which sections of dough are cut from cylindrical columns flowing from nozzles at the bottom of a dough press, the said sections being severed by a reciprocating wire knife, then dropping upon an endless carrier, and passing from under the dough press, are operated upon in different ways, producing what are technically known as top and bottom stamped goods, the completely formed goods being placed upon pans or trays ready for baking; and has for its object the provision of a combined soft dough wire cutting machine, with sugaring device and panning attachment for snaps, and top goods, which shall be easy to operate, and produce goods of a superior quality.

To attain the desired end, my invention consists essentially in certain novel and useful combinations or arrangements of parts, and peculiarities of construction and operation, all of which will be hereinafter first fully described, and then pointed out in the claims.

In the accompanying drawings, Figure 1 is a vertical, longitudinal, sectional view of the machine. Fig. 2 is an enlarged plan view of a portion of the automatic cake stripping device beneath the stamping mechanism. Fig. 3 is a sectional view at line $x$—$x$ of Fig. 2, illustrating the act of stripping a cake from one section of the carrying apron or belt, and the passing of such cake to another section of the carrier, for overcoming adhesion produced by stamping. Fig. 4 shows a like view wherein a bridge is placed between the two portions of the carrier. Fig. 5 is a plan view of a portion of the bridge, and Fig. 6 is a cross-sectional view thereof at line $y$—$y$ of Fig. 5. Fig. 7 is a plan view of the wire cutting device. Figs. 8, 9 and 10 are detail views of the tripping mechanism connected to the wire cutting device, Fig. 9 being an enlarged sectional view taken at $a$ Fig. 7. Fig. 11 is a side elevation of the machine.

Similar numerals of reference, wherever they occur, indicate corresponding parts in all the figures.

Heretofore, stamped or cut goods of the class my machine is designed to produce, have been cut from the solid sheet of dough by a reciprocating cutter, and the surrounding dough or scraps had to be taken off from the machine and worked over.

One of the objects of my invention is to entirely dispense with the formation of scrap, thereby avoiding the necessity and expense of re-sheeting.

The second object of my invention, is to stamp or flatten the severed cakes or sections of dough, thereby giving a perfectly smooth top and bottom to the cakes, removing all roughness caused by the cutting action of the wire, insuring a perfect and uniform product.

The third object of my invention is to provide an automatic distribution of different granulated materials upon the tops of the cut sections or cakes, before they are stamped or flattened, the surplus granulated material not remaining upon the goods, but falling upon the conveyer, being automatically removed therefrom, and deposited in a receptacle provided for it, and again used; the cakes pass from the granulated material, to pans or trays.

A fourth object of my invention is to cut and drop the cakes close together, upon a perfectly flat surface, formed by the conveyer or carrier, which enables the distance between the mouths of the nozzles and the carrier, to be quite short, whereby close location of the cakes, and a complete filling of the entire surface of the carrier is had, without danger of displacement of the cut sections of dough. Such is not the case with the wire cutting machines heretofore produced, as the goods have been allowed to drop directly into pans upon the main carrier, and as these pans are seldom perfectly flat owing to the bending of the metal of which they are constructed, it has been found by experience to be impossible to bring the pans close to the nozzles; hence the goods drop irregularly, upon the edges, &c. and a large amount of available pan surface is lost; these serious defects I entirely overcome by the use of a preliminary carrier for receiving the cakes as they are cut, and distributing them uniformly upon the pans, for baking in the usual manner.

1 represents the two sides of the main frame of the machine, arranged to carry the different bearings and slideways.

2 represents the rods which connect the two sides of the main frame.

3 represents a continuous dough press for supplying a continuous flow of dough through the nozzle plate 4, the nozzle consisting of a series of holes therein of such a shape as to give the desired outline to the cakes or goods; either round, square or scalloped, as preferred; the plate 4 being mounted in ways and made removable or changeable at pleasure.

5 is the wire holding frame, particularly illustrated in Figs. 7, 8, 9 and 10. It is composed of a central shaft 6, to which are clamped a number of fingers 7, the free extremities of which are perforated for the passage and carrying of an extremely fine wire 8, the said wire being held at its extremities by stationary arms, 9, which pass through perforations in the shaft 6 and are secured in place by nuts 10 on each side of said shaft. By loosening these nuts, the arms 9 may be easily turned in their bearings, for winding the cutting wire 8 around their extremities, for the purpose of tightening said wire.

The carrying arms 7, are made adjustable longitudinally upon the shaft 6, so that they may be located to pass between the nozzles projecting from the plate 4, thus accommodating different locations of the nozzles upon said plates, allowing the cutting wire 8 to come in close contact with the edge of the nozzles, and as the wire is carried across this surface, it cuts the outflowing dough into sections or cakes, which fall upon a carrier, to be hereinafter described. To make a perfect operation of this act of cutting, the wire holding frame must travel forward, holding the wire 8 firmly, and cause it to move in a straight line, close to the edge of the nozzles, in the direction of the horizontal arrow shown in Figs. 1 and 8. After the cut has been made, it is necessary to drop the wire to a lower position than it occupies in the forward movement, so that when the recovery is made, the wire will be low enough to pass beneath the outflowing dough from the nozzles. This dropping is immediately followed by the lifting of the wire to its initial position, in a straight line for the operation of cutting. To accomplish this result, the shaft 6 is mounted in two slide bearings 11, located at each end of said shaft, upon the side pieces 1 of the main frame. Sliding motion is imparted to the bearings 11 and shaft 6 by means of two connecting rods, 13, secured at each extremity of the shaft 6, the other ends of the connecting rods being pivoted to arms 15, mounted upon a rock-shaft 14. The arm 15, shown in Fig. 11, extends below the shaft 14, and engages with a rod 16 which is pivoted to a crank-plate 17, shown in said Fig. 11. The reciprocation of rod 16 causes an oscillation of the rock-shaft 14 and a consequent reciprocating movement of the wire cutter.

In Fig. 8 is shown an enlarged side elevation of one of the bearings 11 of the cutting frame. 18 and 19 are stops, mounted upon the bearing 11, each being perforated for the reception of a set screw 105 and 106. Projecting from, and firmly secured to the shaft 6, is a pin 20, arranged to come in contact with the inner ends of the set screws 105 and 106. The full lines in Fig. 8 show this stop pin 20 hard up against the set screw 105, and when in this position the forward movement of the wire cutter is made. Directly preceding the return stroke of the cutter, the shaft 6 slightly rotates, dropping the wire 8 and the fingers 7 and 9 connected to the shaft 6, to the position indicated by the dotted lines in Fig. 8, and when in this position the stop pin 20, is in close contact with the set screw 106, said set screws regulating the upper and lower position of the cutter. To accomplish this automatic dropping and raising of the cutter, at the extreme ends of the forward and return movement of the cutter the following mechanism is employed.

In Fig. 9, 21 is a circular friction plate, firmly keyed to the shaft 6; next to it, and in close contact therewith is a gear wheel 22. Outside of this gear wheel 22, is a circular flange 23, which is also keyed to the shaft 6, not firmly, but so as to permit a longitudinal sliding movement upon the shaft 6, which enables it to press firmly against the gear wheel 22, making a frictional contact therewith through the interposition of two friction washers 24, made of suitable material, thus making a frictional contact between the gear wheel 22 and the shaft 6. Upon the extreme end of the shaft 6, is a set screw 25 which is screwed into the end of the shaft 6, and has coiled around it, a spring 26, which bears under the head of the set screw 25 on one end, and on the other against the washer 27, which presses by the action of the spring 26, the flange 23, against the gear wheel 22, making the friction contact above mentioned. This gear wheel 22 engages with a stationary rack 28. Surrounding the flange 23, is one of the connecting rods 13.

The operation of this frictional mechanism is as follows: When the connecting rods 13, push the wire cutting frame in the direction of the horizontal arrow (Fig. 8), the gear wheel 22, rotates for a short distance in the opposite direction, and carries the wire holding arm and wire in an upward direction, so that the stop pin 20 comes in contact with the set screw 105, preventing further rotation of the shaft 6 in that direction, but the gear wheel 22 continues to turn and pass over the rack 28, overcoming the friction of the washers 24, and holding the stop pin 20 hard against the set screw 105, until the forward cut is completely made. The recovery now takes place, and the backward movement immediately causes the stop pin 20 to come in contact with the set screw 106, by the action of the friction gear 22 turning the shaft 6, and as the return movement continues, the pin 20 will be firmly held against the set screw 106, thereby causing the wire cutter to drop to its lowest position, clearing the outcoming dough from the nozzles. The repeated movement of the cutter causes row after row of cakes or sections of dough to be dropped upon the endless preliminary carrier, 29, as illustrated in Fig. 1. This preliminary carrier travels in the direction indicated by the arrows, around a roller 30 mounted in journals in the main frame, and running in close contact with flat plate 31. After passing around the roller 30, the preliminary carrier 29 returns around a driving drum 32, then travels in a forward direction around a second drum 33, then backward again, and around another small roller 34, mounted on a movable plate 35, having slots in its ends (Fig. 2). In these slots are located fastening bolts, 36, engaging with projections 107, in the main frame. This construction enables the locating of the roller 34 close to roller 30, or at a distance therefrom, the object of such construction to be hereinafter explained. After passing around the roller 34, the preliminary carrier 29, passes downward in an inclined direction, toward a main carrier, 37, coming in close contact therewith. Preliminary carrier 29, next passes around and beneath a plate 38, held in position by two sliding bearings, 39, operated by hand wheels 40, mounted upon screws 108. By this arrangement, the slack of the preliminary carrier may be readily taken up. The said carrier now returns around a drum 41, to pass again beneath the dough nozzles. Two of the drums 32 and 41, are geared together, power being applied to the shaft of drum 41. The chain 42, after passing around this chain wheel, passes over a second chain wheel mounted upon the shaft of the drum of the main carrier apron 37, which also gives motion to said main carrier, as will be hereinafter explained. Continuing around and engaging with a third chain wheel mounted upon a cone pulley shaft 43, the chain 42 turns in an upward direction to the place of starting, that is, the chain wheel mounted upon the shaft of the drum 41. Located above the preliminary carrier 29, is a sieve or box 44, which is fixed at one edge to a shaft 45, mounted in bearings at the sides of the main frame. Agitation is given to this sieve by two ratchet wheels, 46, the teeth of which come in contact with curved arms 47, firmly fastened to the sides of the sieve 44. The rotation of the ratchet wheels 46 causes the agitation of the sieve 44, which is adapted to contain granulated material, which by this movement is sifted upon the cakes which pass underneath upon the preliminary carrier 29. The movement of said carrier 29 carries the cakes beneath the stamping plate 48, fastened to an oscillating bar 49, which reciprocates in slide-ways 50, receiving motion by being connected upon its extreme ends to two rods 51. These rods 51 are attached to eccentrics 52 on each side of the machine, which are keyed to a shaft 53. This shaft 53 is mounted in bearings in the main frame, and in rotating will cause an upward and downward movement of the stamping plate 48. To prevent adhesion of this stamping plate 48, it is provided with an endless belt 54 which passes under the lower surface thereof, completely covering the same, and around a small roller 55, and from thence around a driving drum 56, which supplies its motion. This belt 54, is propelled continuously in the direction of the arrow (Fig. 1), and as it passes over the driving drum 56, it receives flour from a flour pocket 57, said pocket being kept full of flour at all times. The preliminary carrier 29, has also a continuous travel, and it will be readily seen that both the belts 29 and 54, must travel in union, having the same speed. To accomplish this, the three driving drums, 32, 33 and 56, must be of the same diameter, and be driven by chain wheels of the same size. A chain wheel of a given diameter is placed upon the shaft of drum 32; passing around this wheel is a chain 58, shown by the dotted lines in Fig. 1. This chain passes around a second chain wheel upon the shaft of the drum 33, and from thence upward to a wheel upon the shaft of the driving drum 56, and then returns to the back part of the machine, passing under a tightening roller 59, to the point of starting. This chain arrangement gives a positive continuous feed to both of the carriers 29 and 54, the carrier 29 conveying the cakes, and the carrier 54 flour dust. As the action of the stamp plate 48 is intermittent, and the preliminary carrier 29 and dust cloth or carrier 54 are continuous, and both travel in the same direction, the cakes are not displaced by this intermittent stamping motion. After the stamping or flattening of the cakes has been accomplished, they pass forward and are liberated from the preliminary carrier 29, by the said carrier being stripped from under them, as clearly illustrated in Fig. 3, which shows a cake in the act of passing over the stripping device. This stripping device is the subject of Letters Patent granted to me on the 2d day of December, 1890, No. 441,890. A modification of this stripping device is shown in Fig. 4, and performs another function than that of merely stripping the cakes from the carrier, said function not being shown or claimed in the aforesaid Letters Patent No. 441,890. It consists in placing between the two rollers 30 and 34, a bar 60, which forms a bridge connection between the two rollers 30 and 34 by means of upwardly projecting pieces, 61, placed at regular intervals on the bar 60, said pieces being designed to carry upon their upper ends the cakes as they pass forward from one portion of the preliminary carrier 29 to another. It will be readily seen that all granulated material which drops from the preliminary carrier 29 must necessarily drop between the rollers 30 and 34, and will fall into a box 62. When goods, not covered with granulated material, are being made, the bridge bar 60 is removed, and the roller plate 35 brought closely to the roller plate 31, as hereinabove described. The cakes on the preliminary carrier 29 travel down the incline, and are finally deposited in trays or pans 63, which rest upon the main carrier 37, and move therewith. This carrier 37, has also a positive continuous movement, in the same direction as the preliminary carrier 29, but has a slightly increased speed, thereby receiving and placing the cakes upon the pans or trays 63, at a greater distance apart than they were upon the preliminary carrier 29. This increased motion is necessary in order to insure a positive transferring of the cakes from the preliminary carrier 29 to the pans or trays 63. As the pans or trays are filled, it is necessary to move them out quickly from the preliminary carrier 29, so that the following pan will be in such a position as to receive the cakes, and not to have them drop between two of the pans 63. To accomplish this forward motion, a hand wheel 64 is provided to give this forward or skip motion to the main carrier 37, which passes around a roller 65 to the shaft of which is secured the hand wheel 64. The roller 65 performs a double function; that of tightening the main carrier 37, and also that of accomplishing the above mentioned skip motion. The shaft of the roller 65 is mounted in slide bearings 66, having hand screws 67, designed for keeping the main carrier 37 tightly stretched.

Power is applied to the main carrier 37, by passing it around a driving roller 68, the shaft 69, of which is mounted in bearings in the sides 1 of the main frame. At one of the ends of this shaft 69, is keyed a chain wheel, which engages with the chain 42, from which it receives its motion. Power is applied to the entire machine from a central driving shaft 70, carrying a driving pulley 71. This shaft 70 gives motion to the crank-plate 17, which operates the wire cutter, as before described. This shaft 70 is centrally located between two other shafts, propelling them by means of gearing, causing them to travel in the directions indicated by the arrows in Fig. 1. The application of power from this main driving shaft 70 to the shaft 72, is made by means of a gear and pinion, 74 and 75. The gear 75 is keyed to one end of the shaft 72, in the center of which is a cone 76, all rotating in bearings in the main frame. A similarly constructed cone 77, is located at the left of cone 76, mounted upon the shaft 43. These cones 76 and 77 are to give varied speeds to the shaft 43, and as this shaft 43 drives both the main carrier 37 and the preliminary carrier 29, and the dust carrier 54, the cut cakes from the nozzles 4, can be located close together, or far apart on the preliminary carrier, by this differential speed arrangement constituted by the cone pulleys 76 and 77.

For providing a hand adjustment of the belt 78 which connects the cones 76 and 77, a square cross shaft 79 is employed, and sliding upon this cross shaft is a sleeve 80, having a hand wheel and screw 81, for securing it at any desired point. The sliding sleeve 80 has two belt forks 82 and 83, one engaging with the upper part of the driving belt 78, and the other with the lower part of the said belt. The sliding sleeve 80 with the belt shifters attached, gives a positive location and holding of the driving belt 78, at any desired point, and consequently any required speed of the connected parts can be obtained.

Power is applied to the continuous dough press as follows: To the shaft 70, just inside of the main frame, is secured a driving pinion 84, which engages with a large gear 85. The gear 85 is keyed to the shaft 73. At the end of the shaft 73 is a slotted, adjustable crank, 86, carrying a sliding crank pin 87, which may be adjusted by the hand screw 88. Journaled to the crank-pin 87, are two connecting rods 89 and 90, the upper ends of which are pivoted to two oscillating pawl arms 91 and 92. On the inside of each of these arms 91 and 92 are pawls which engage with the ratchet wheel 93. The rotation of the crank 86, will give any desired motion to the ratchet wheel 93, more or less, in accordance with the adjustment of the crank-pin 87. The ratchet wheel 93 is keyed to a shaft 94 which carries the feed roller 95 of the dough press 3, and propels the same, causing the dough to flow through the nozzles 4, the desired amount being obtained by means of the adjustment of the crank pin 87. From the crank shaft 73 motion is transmitted to the stamping device by means of a chain wheel 96, keyed to the shaft 73. This chain wheel engages with an endless chain 97, thereby transmitting power to the smaller chain wheel 98, which is keyed to the eccentric shaft 53. Power is also taken from the shaft 73 to agitate the sifter 44 by means of an endless chain 99.

For dusting the preliminary carrier 29, a box 100 is provided, the bottom of which is formed by the carrier and roll 41.

In order to accurately adjust the stamping plate 48, for flattening the cakes, two studs 101 are fastened to the ends of the stamp plate, which project upward through holes in the cross-head 49, said studs being provided with jam nuts 102, by which the height of the stamp may be accurately regulated.

Having now fully described my invention, what I claim as new therein, and desire to secure by Letters Patent, is—

1. A soft dough machine in which is comprised a dough press provided with escape nozzles; a wire cutting device having a trip; a preliminary carrier for receiving the cakes; a stamping device; mechanism for applying granulated material to the cakes, and for stripping the cakes from the preliminary carrier, and a main pan carrier toward which the preliminary carrier converges; the whole combined and arranged to operate, substantially as shown and described.

2. In a machine of the character herein specified, a wire cutter consisting of a series of fingers secured to an oscillating shaft and bearing a wire; a gear wheel frictionally mounted upon said shaft; a stationary rack with which said gear engages, and means for imparting a reciprocating movement to the cutter, substantially as shown and described.

3. In a machine of the character herein specified, the combination with a dough press, of a wire cutter, a preliminary carrier, and a pan carrier, substantially as shown and described.

4. In a machine of the character herein specified, a stamping device beneath which an endless dust covered carrier passes, in combination with a carrier therebeneath; a fixed support beneath said carrier, and means for imparting a uniform movement to the carriers, substantially as shown and described.

5. In a machine of the character herein specified, a dough press; wire cutter; preliminary carrier; stamping device, and pan carrier, the whole combined and arranged to operate, substantially as shown and described.

JAMES H. MITCHELL.

Witnesses:
CARL F. GEYER,
FRED. C. GEYER.